March 8, 1966  C. L. LAMB, JR  3,238,659
FISHING EQUIPMENT
Filed March 27, 1963  2 Sheets-Sheet 1
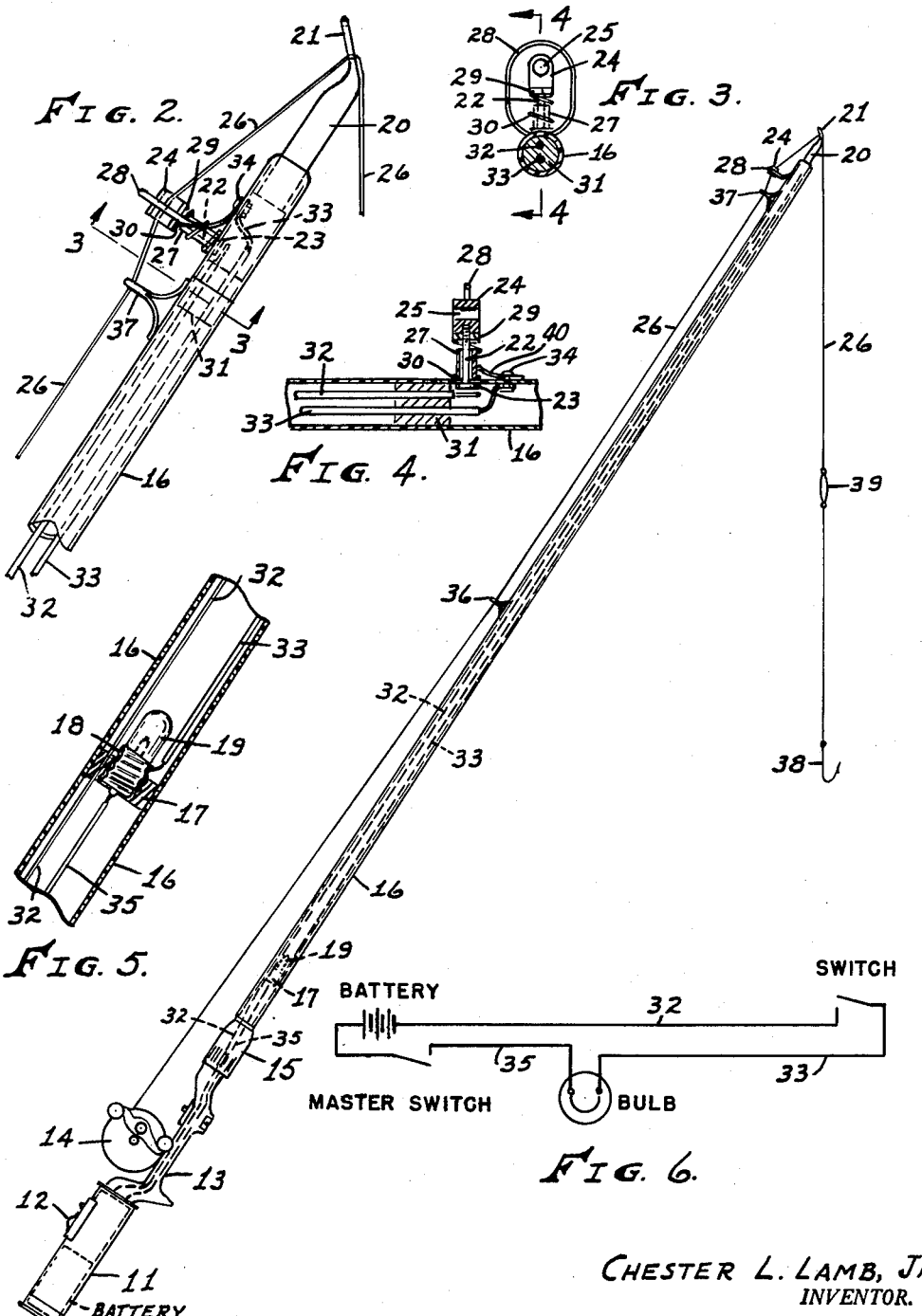
CHESTER L. LAMB, JR.,
INVENTOR.
BY Donald E. Windle
ATTORNEY.

March 8, 1966 C. L. LAMB, JR 3,238,659
FISHING EQUIPMENT
Filed March 27, 1963 2 Sheets-Sheet 2
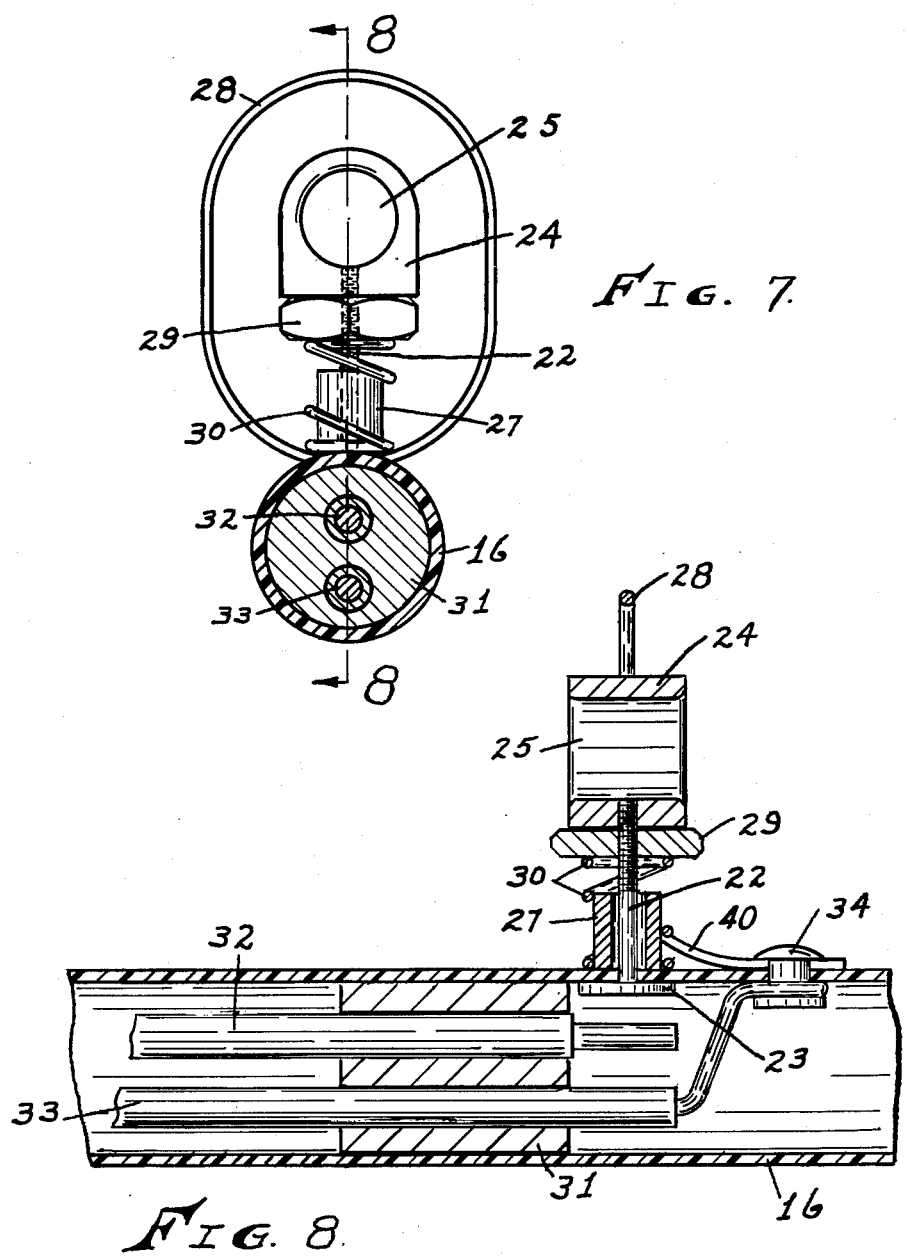
CHESTER L. LAMB, JR.
INVENTOR.
BY Donald E. Windle,
ATTORNEY.

United States Patent Office 3,238,659
Patented Mar. 8, 1966

3,238,659
FISHING EQUIPMENT
Chester L. Lamb, Jr., 1208 S. 4th St., Richmond, Ind.
Filed Mar. 27, 1963, Ser. No. 268,330
1 Claim. (Cl. 43—17)

The present invention relates to fishing equipment and more especially to fishing rods having means of illumination incorporated therein. I am fully aware that fishing rods having tell-tale lights are old in the art. I am further aware that the conventional means of providing tell-tale illumination are in the form of attachments or accessories, with the same having means for attachment to the exterior of the fishing rod.

In view of the above, it is the principal object of the present invention to provide illuminating means entirely within the fishing rod and thereby eliminating the possibility of the same becoming accidentally dislodged from the rod, either by loosening in use or by snagging on a foreign object.

A third object is the provision of an illumination means incorporated in a fishing rod.

Another object of the invention is the provision of illumination means confined within the fishing rod which can, in an emergency, provide illumination of the area or pathway in darkness.

Still further objects and particular advantages of the invention will suggest themselves in the course of the following description, and that which is new and novel will be set forth in the appended claim.

The presently-preferred and most satisfactory manner of carrying out the principles of the invention in a practical and efficient manner is shown in the accompanying drawings forming a part thereof, in which:

FIGURE 1 is a side elevation of a fishing rod embodying the features of the invention.

FIGURE 2 is an enlarged elevation of the free end of the rod.

FIGURE 3 is a detail section-elevation, taken on line 3—3 of FIGURE 2.

FIGURE 4 is a longitudinal section through the free end of the rod, as taken on line 4—4 of FIGURE 3.

FIGURE 5 is a section-elevation through a portion of the rod in which the bulb is located.

FIGURE 6 is a diagram showing the electrical circuit of the illumination means.

FIGURE 7 is a detail section-elevation similar to that shown in FIGURE 3, but on an enlarged scale.

FIGURE 8 is a longitudinal section through the rod and the switch, taken on line 8—8 of FIGURE 7, and with the same being similar to FIGURE 4, but on an enlarged scale.

Like characters of reference designate like parts throughout the several views of the drawings.

Referring now to the drawings in detail, numeral 11 designates the handle of the rod with the same also serving as a battery receptacle and with there being the master switch 12 incorporated therein. Numeral 13 designates a reel-carrying portion and provides for positioning of reel 14. Located forwardly of the reel-carrying portion 13 is a ferrule 15 which provides means removably securing the rear end portion of rod 16 into the forward end of the reel-carrying portion 14. The rod is preferably formed of a slightly tapered translucent or transparent material with the same being hollow for the reception of illuminating means therein.

A plug 17 is located within the tubular rod 16 a short distance forwardly with relation to the rear end of the rod. The plug 17 has a lamp base receiving aperture in which lamp base 18 is rigidly secured and with the bulb 19 being removably secured therein in the conventional manner.

The forward or free end of the hollow rod 16 is closed by means of tip member 20 which is adapted to slip fit into the end of the rod, and with the tip member 20 being provided, at its forward end, with eye 21.

A plunger type switch is located a short distance rearwardly of the tip member 20 and is secured on the upper side of the rod. An aperture is formed through the wall of the rod 16 through which plunger member 22 extends. The lower end of plunger 22 has a flattened contact head 23 formed thereon. The upper end of plunger 22 is provided with threads for the reception of head 24 which has aperture 25 provided therethrough for the reception of fishing line 26. A guide tube 27 has the lower end thereof rigidly and permanently secured to the base of loop 28 with the tube being provided for the reception of plunger 22, as more clearly shown in FIGURES 4 and 8. Threaded nut 29 is provided on the plunger 22 and provides means of locking and maintaining the adjustment of head 24 on the upper end portion of plunger 22. A compression spring 30 is positioned about the tube 27 with the lower end of the spring seating on the base of loop 28, and with the upper end of the spring bearing against the lower surface of nut 29. The upper end of tube 27 provides a stop and lower limit for the vertical movement of the head 24, with the upper surface of contact head 23 providing means limiting the upward movement of head 24. Vertical adjustment of the head 24 and the nut 29 provides means adjusting the compression of spring 30 as will be more fully set forth hereinafter.

A terminal plug 31 is located rearwardly and adjacent the contact head 23 of the plunger 22, as shown in FIGURES 2, 4 and 8. Plug 31 has a pair of spaced apart parallel bores formed longitudinally therethrough for electric wires 32 and 33. It will be noted that the forward end of wire 32 is without insulation and terminates directly under contact head 23. The forward end of wire 33 is electrically connected with tube 27 by means of rivet 34 and connecting wire 40. The tube 27 is in electrical contact with the spring 30, which is in contact with the nut 29 which is in contact with the plunger 22 at the upper end thereof. In addition, upon depression of the head 23 and the plunger 24, the lower surface of the nut 29 will establish contact with the upper surface of the tube 27 as the head 23 contacts the exposed terminal of the wire 32, providing additional means whereby the circuit from the wire 40 may reach the member 32. The rear end of wire 33 is electrically connected with the bulb socket 18. The rear end of wire 32 extends rearwardly where the same is connected to the positive terminal of the battery. Wire 35 extends from the bulb contact rearwardly through the reel-carrying portion 13 to the master switch 12 located in the handle. Tube 27 and loop 28 are secured to rod 16 by means of current or other suitable means.

It will be noted, by referring to the drawing, that the fish line 26 extends from reel 14 forwardly through eye 36, then through eye 37 and through aperture 25 of head 24, with the line 26 then passing through eye 21, there being a fish hook 38 secured on the end of the line. A sinker 39 is shown secured on the line above the hook 38.

It will further be noted, by referring to FIGURES 1 and 2 that the aperture 25 is higher than eye 37 causing line 26 to provide a downward pressure on head 24 and plunger 22 against the compression of spring 30. The act of a fish biting on bait carried by the hook 38 creates a pull on line 26, and with the tightening of the line between the hook 38 and reel 14, the tautness of the line line 26 creates a downward pressure of the head 24 and plunger 22, bringing contact head 23 into electrical contact with the forward end of wire 32.

When fishing in darkness, master switch 12 is pushed to the "ON" position, thereby closing the electrical circuit between wires 32 and 35. With there being no fish biting, plunger 22 is held out of contact with the forward end of wire 32 by the compression spring 30. When a fish bites on the baited hook, the line 26 becomes sufficiently taut to compress spring 30 by the downward pressure exerted on head 24 by the tautness of the line and bringing the contact head 23 of plunger 22 into electrical contact with the forward end of wire 32 and completing circuit to the bulb through wire 33.

Loop 28 provides a guard for the head 24 and protects the same against accidental contact with foreign objects.

It will further be noted that the fisherman may use the device to provide illumination for walking in darkness by reeling the line until the sinker is drawn tightly against the eye 21 which provides sufficient tautness in the line to push plunger 22 into contact with the forward end of wire 32.

When the rod is being used in daylight, the master switch 12 is kept in "OFF" position and eliminating the flow of electrical current through the circuit.

Should it be desirable to use the device in connection with a sectional rod, suitable connectors may be used in wires 32 and 33.

The invention has been shown and described in its presently-preferred form but I desire that it be understood that minor changes may be made therein, insofar as the changes may fall within the scope and spirit of the appended claim.

Having now shown and described the invention, what I claim and desire to secure by Letters Patent of the United States, is:

In fishing equipment comprising a handle member having electrical batteries contained therein, a hollow rod secured to the forward end of the handle and extending forwardly therefrom, an electrical bulb located in the hollow rod forwardly of the handle, an electrical switch located forwardly of the electrical bulb, said electrical switch being mounted on and secured through the wall of the hollow rod, said electrical switch comprising a loop secured externally of the hollow rod, a head member positioned within the loop, a plunger threaded into the head member and extending downwardly therefrom and through the wall of the hollow rod with a contact head being formed on the lower end of the plunger, a tube loosely surrounding the plunger with the lower end of the tube being rigidly secured to the base of the loop, a nut threaded on the plunger and located adjacent the lower end of the head member, a compression spring having its lower end bearing on the external surface of the hollow rod and with its upper end bearing against the underside of the nut, with said nut providing means adjusting the compression of the spring, electrical wires connecting the batteries with the electrical bulb with one of the wires extending forwardly to a position directly below the contact head of the plunger, with a second wire being electrically connected with the tube, whereby downward vertical movement of the head member bringing the lower surface of the contact head into electrical contact with the first-mentioned wire and completing an electrical circuit from the batteries through the electrical bulb.

References Cited by the Examiner

UNITED STATES PATENTS

| | | | |
|---|---|---|---|
| 1,337,292 | 4/1920 | Timmons | 43—17 |
| 2,616,202 | 11/1952 | Romberger | 43—17 |
| 2,663,110 | 12/1953 | Guzy | 43—17 |
| 3,024,561 | 3/1962 | Wyatt | 43—17 |
| 3,074,196 | 1/1963 | Bronson | 43—17 |

FOREIGN PATENTS 969,979  6/1950  France.

MELVIN D. REIN, *Acting Primary Examiner.*

JOSEPH S. REICH, ABRAHAM G. STONE,
*Examiners.*